3,349,102
ETHERS USEFUL AS MOLLUSCACIDES
AND PISCICIDES
Clive Beresford Challis Boyce, Herne, England, assignor to Shell Oil Company, New York, N.Y., a corporation of Delaware
No Drawing. Filed June 17, 1963, Ser. No. 288,432
Claims priority, application Great Britain, June 29, 1962, 25,076/62
7 Claims. (Cl. 260—347.8)

This invention relates to a method of combatting molluscs, particularly snails of the genera Oncomelania, Australorbis and Bulinus which are schistosome intermediate hosts, and snails of the genera Lymnaea which are intermediate hosts for the liver fluke worm, and to a method of reducing the incidence of Bilharziasis which comprises treating said molluscs or their habitat, or both molluscs and their habitat, with a molluscacidal compound as hereinafter specified, or with a composition comprising said compound. The invention also relates to novel molluscacidal compounds, to a process for their preparation and to molluscacidal compositions comprising any of said compounds.

According to this invention, molluscs are controlled by subjecting them to the effect of a compound of the formula

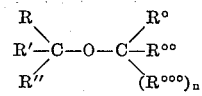

wherein R and R' each independently represents a phenyl radical or a phenyl radical substituted by from one to a plurality of substituents from the group consisting of middle halogen atoms, lower alkyl radicals and lower alkoxy radicals, or a heterocyclic radical possessing aromatic-type unsaturation, or such a hetero radical substituted by from one to a plurality of such substituents; R'' represents hydrogen or a radical of the group represented by R; R° represents a lower alkyl radical, a lower alkenyl radical or a lower cycloaliphatic hydrocarbon radical, or one of such radicals substituted by from one to a plurality of middle halogen atoms, or a heterocyclic radical, unsubstituted or substituted by from one to a plurality of middle halogen atoms; R°° is hydrogen or phenyl; or R° and R°° together can represent a divalent radical each of R° and R°° representing one bond of that radical which together with the indicated carbon atom forms a carbocyclic or heterocyclic ring, which may be saturated or unsaturated; R°°° is hydrogen, and $n$ is 1, with the proviso that when R° and R°° together represent a divalent radical, $n$ may be 0, with the indicated bond from R°°° to the indicated carbon atom forming one bond of an olefinic linkage in the divalent radical.

By "middle halogen" is meant bromine and chlorine, with chlorine being preferred. By "lower alkyl," "lower alkoxy" and "lower alkenyl" is meant such radicals containing from 1 to 6 carbon atoms, with a maximum of 4 carbon atoms being preferable. Suitably, they can be of straight-chain or branched-chain configuration. Preferably, the alkenyl group is of vinyl character—that is, the carbon atom thereof bonded to the indicated carbon atom is also involved in olefinic linkage with another carbon atom of the alkenyl group, even though the alkenyl group may be a part of a ring, as in a cycloalkenyl group. By "lower cycloaliphatic hydrocarbon" is meant a carbocyclic group of up to ten carbon atoms, with from 5 to 6 carbon atoms in the ring; it may be a cycloalkenyl or a cycloalkadienyl radical. By "heterocyclic radical possessing aromatic-type unsaturation" is meant those heterocyclic compounds containing from 5 to 6 members in the ring, one of which is oxygen, sulfur or nitrogen, the remainder being carbon, which exhibit the chemical properties of aromatic compounds, such as benzene. Also included are those compounds in which the hetero ring is fused with a carbocyclic ring. The hetero ring is in all cases bonded to the indicated carbon atom by bond to a carbon atom of the ring. Typical heterocyclic radicals of this kind include the radicals derived from furan, thiophene, pyrrole, pyridine, pyrilium compounds, quinoline, isoquinoline, indole, thionaphthene and the like, and their partial or completely hydrogenated derivatives.

When R° represents heterocyclic, preferably the heterocyclic radical is one of those described above.

R° and R°° together may represent a divalent radical which with the indicated carbon atom forms a carbocyclic or heterocyclic ring, R° representing one bond and R°° representing the other bond of that radical. R° and R°° thus together can represent an alkylene radical, or an alkenylene radical (since the ring can be unsaturated). Where R° and R°° represent an alkenylene radical, the olefinic unsaturation may involve the indicated carbon atom and a carbon atom of the alkenylene radical—that is, R°°° is a bond of the olefinic linkage involving the indicated carbon atom. Desirably, however, the olefinic unsaturation is vinyl with respect to the indicated carbon atom—that is, the indicated carbon atom is bonded by a single bond to a carbon atom of the alkenylene radical that is involved in the olefinic linkage. Preferably, the divalent group contains from four to five atoms, with not more than one being hetero, and this of the group consisting of nitrogen, sulfur and oxygen.

Because of their desirable biochemical characteristics, componnds of certain subgenera of the ethers of this invention are of particular interest. These subgenera are:

(1) Trityl (triphenylmethyl) ethers of the invention having the formula

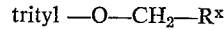

trityl —O—CH$_2$—R$^x$ wherein R$^x$ represents an unsubstituted cyclic radical of from 5 to 6 atoms, wherein the cyclic radical is a cycloalkyl (cyclopentyl or cyclohexyl) radical or a heterocyclic radical in which the ring contains from 4 to 5 carbon atoms and one nitrogen, sulfur or oxygen atom, the radical being bonded to the indicated methylene group by a bond from a carbon atom thereof. Trityl cyclopentylmethyl ether is an example in this subgenus. The heterocyclic group may be unsaturated or saturated. A class of the ethers containing these heterocyclic radicals of particular interest is that wherein the heterocyclic radical contains from 4 to 5 carbon atoms and one hetero oxygen atom, especially the 2 - furyl, 2 - tetrahydrofuryl and 2-tetrahydropyranyl radicals.

(2) Diphenylmethyl alpha-alkylbenzyl ethers of the formula

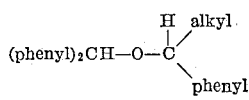

wherein alkyl is alkyl of from 1 to 7 carbon atoms, the n-propyl derivative being of particular interest.

Typical species of these compounds are described, and their preparation shown in Examples I through X, following. These compounds are believed to be novel, and accordingly form one aspect of this invention.

Another aspect of the invention is the provision of a simple, efficient process for preparing certain of the compounds of the invention. Briefly, this process comprises reacting in the presence of a hydrogen halide acceptor, a halide of the formula

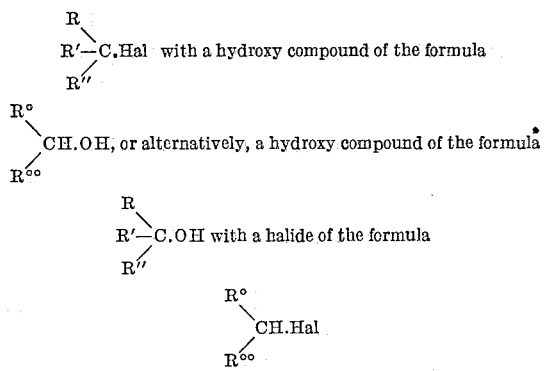

wherein Hal represents a chlorine, bromine or iodine atom, and the other symbols have the respective meanings hereinbefore specified. The halogen present in the reactants is preferably chlorine or bromine. Symmetrical compounds according to the invention may be made by catalyzed dehydration of the corresponding carbinols.

The process of the invention may be carried out in absence of an inert solvent but an inert solvent is preferably employed. Acetonitrile has been found to be particularly suitable for this purpose. Acetone is also a good solvent, particularly in the preparation of compounds of the above general formula where R and R' each represent a phenyl group or heterocyclic group and R°°° represents a hydrogen atom. Aromatic hydrocarbon solvents are suitable when preparing compounds of the above general formula when R, R' and R'' each represent a phenyl or a heterocyclic group.

Hydrogen halide acceptors which are suitable for use in the process of the invention are tertiary nitrogenous bases such as pyridine or a trialkylamine. Triethylamine is the preferred hydrogen halide acceptor. Alkali or alkaline earth metal hydroxides, alkoxides, carbonates or bicarbonates cause hydrolysis of the reactants and are not therefore suitable.

The process is suitably carried out at a temperature in the range 50° to 120° C. though temperatures above or below this range may be employed if desired. Preferably, the process is effected at a temperature in the range 50° to 90° C., when reaction times of 1 to 4 hours in general suffice.

At the end of the reaction period the mixture is cooled and filtered to remove precipitated halide formed by reaction of the hydrogen halide acceptor with hydrogen halide produced. If necessary, an inert solvent such as ether or benzene can be added to facilitate precipitation of the halide. The filtrate may then be washed with water to remove any remaining halide, dried and the solvent removed. Alternatively, the reaction mixture may be poured into water and, if the product is not a solid, the desired ether may be extracted with a solvent, for example, ether, and the extract then dried and the solvent removed. The residue thus obtained may be distilled under reduced pressure or, if solid, may be recrystallized from a solvent.

The following examples illustrate the novel compounds of the invention and the process for their preparation. In these examples, parts by weight (w.) and parts by volume (v.) bear the same relation as the kilogram and the litre.

*Example I.—Preparation of 2-chloroethyl trityl ether*

$$Ph_3C.O.CH_2.CH_2Cl$$

A mixture of trityl chloride (70 w.), ethylene chlorohydrin (20 w.), triethylamine (25 w.) and acetonitrile (100 v.) was heated under reflux for 2 hours. The solution developed a wine-red color on warming. The mixture was then cooled and triethylamine hydrochloride formed was filtered off and washed with ether. Solvent was then removed from the filtrate and washings and the residue was recrystallized from hexane. The product had M.P. 132° to 133.5° C. Yield: 70 w.

*Analysis.*—Found: C, 77.9; H, 6.1; Cl, 10.6%. $C_{21}H_{19}OCl$ requires: C, 78.1; H, 5.9; Cl, 10.8%.

*Example II.—Preparation of allyl trityl ether*

$$CPh_3.O.CH_2CH=CH_2$$

A mixture of trityl chloride (14 w.), allyl alcohol (2.9 w.), triethylamine (5 w.) in benzene (20 v.) was heated under reflux for 2 hours. The triethylamine hydrochloride formed was filtered off, washed with ether, the solvent removed from the filtrate and washings and the residue recrystallized from light petroleum (B.P. 60°–80° C.) to give a white powder, M.P. 73° to 75° C.

*Analysis.*—Found: C, 88.5; H, 6.7%. $C_{22}H_{20}O$ requires: C, 88.0; H, 6.7%.

*Example III.—Preparation of 2-furfuryl trityl ether*

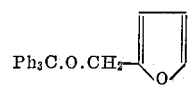

A mixture of furfuryl alcohol (50 w.), trityl chloride (140 w.) and triethylamine (51 w.) and acetonitrile (200 v.) was heated under reflux for 3 hours then cooled. The triethylamine hydrochloride formed was filtered off and washed with a little benezene and dry ether. The combined filtrate and washings, with added decolorizing charcoal, were heated to boiling and filtered. The solvent was then removed from the filtrate leaving a brownish powder which on recrystallization from ethanol was obtained as yellowish white flakes, melting at 142° to 144° C. Yield 120 w. (70%).

*Analysis.*—Found: C, 84.7; H, 6.1%. $C_{20}H_{24}O_2$ requires: C, 84.7; H, 5.9%.

*Example IV.—Preparation of 2-tetrahydrofurfuryl trityl ether*

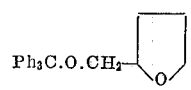

A mixture of trityl chloride (140 w.), tetrahydrofurfuryl alcohol (51 w.), triethylamine (50.5 w.) and benzene (200 v.) was heated under reflux for 3 hours and the mixture worked up as described in Example I except that the product was recrystallized from light petroleum (B.P. 40°–60° C.). It was obtained as yellow crystals, M.P. 80° to 83° C.

*Analysis.*—Found: C, 83.5; H, 6.6%. $C_{24}H_{24}O_2$ requires: C, 83.7; H, 7.0%.

*Example V.—Preparation of tetrahydropyran-2-ylmethyl trityl ether*

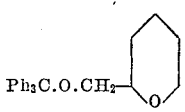

A mixture of trityl chloride (14 w.), 2-hydroxymethyl-tetrahydropyran (6 w.) and triethylamine (5 w.) in acetone (100 v.) was heated under reflux for 3 hours and then poured into water. The tacky solid which separated was triturated with ethanol and then recrystallized twice from the same solvent. The product had M.P. 97° to 98° C. Yield 8.4 w.

*Analysis.*—Found: C, 83.6; H, 7.6%. $C_{26}H_{26}O_2$ requires: C, 83.8; H, 7.3%.

*Example VI.—Preparation of cyclopentyl trityl ether*

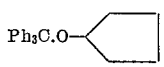

A mixture of trityl chloride (140 w.), cyclopentanol (45 w.), triethylamine (50 w.) and acetonitrile (500 v.) was heated under reflux for 2 hours. The mixture was poured into water, the aqueous mixture extracted with ether, the ethereal extract dried over anhydrous magnesium sulphate and concentrated. The residue was triturated with methanol and the solid then recrystallized twice from methanol. The product separated as colorless prisms, M.P. 58° to 60° C. Yield 65%.

*Analysis.*—Found: C, 87.7; H, 7.4%. $C_{24}H_{24}O$ requires: C, 87.8; H, 7.4%.

*Example VII.—Preparation of bis-(2-thienylphenylmethyl) ether*

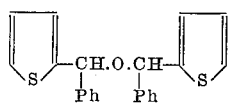

A solution of thienylphenylmethanol (20.0 w.) and 4-toluenesulphonic acid (0.2 w.) in benzene (100 v.) was heated on a boiling water bath until no further water of reaction was produced (about 10 minutes). The solution was then washed with water, dried over anhydrous magnesium sulphate and the solvent then removed. The residue (18 w.), which solidified on trituration with a little ethanol, was extracted with boiling ethanol and the resulting solution separated from a less soluble red tar. On cooling the ethanol solution, a solid was deposited which after recrystallization from ethanol was obtained as colorless needles, M.P. 78° C. Yield 12 w. (64%).

*Analysis.*—Found: C, 73.0; H, 5.1; S, 18.3%. $C_{22}H_{18}OS_2$ requires: C, 73.0; H, 5.0; S, 17.7%.

EXAMPLE VIII.—*Preparation of diphenylmethyl alpha-2'-thienylbenzyl ether*

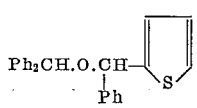

A mixture of diphenylbromomethane (12.35 w.), 2-thienyl carbinol (9.5 w.), triethylamine (5.05 w.) and acetonitrile (20 ml.) was refluxed for 3 hours on a water bath maintained at a temperature not higher than 82° C. The solvent was removed by warming the mixture to about 35° C. under reduced pressure. The residue was washed with water to remove triethylamine hydrobromide, extracted with ether and recrystallized from glacial acetic acid. The product had M.P. 91.5 to 93.5° C. Yield 11 w. (86%).

*Analysis.*—Found: C, 81.1; H, 5.5; S, 8.2%. $C_{24}H_{20}SO$ requires: C, 80.9; H, 5.6; S, 9.0%.

EXAMPLE IX.—*Preparation of diphenylmethyl 1-phenyl-n-octyl ether*

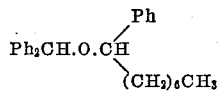

A mixture of diphenylbromomethane (12.35 w.), phenylheptyl carbinol (10.25 w.), triethylamine (5.05 w.) and acetonitrile (30 v.) was boiled under reflux for 3 hours. Triethylamine hydrobromide was then filtered off and washed with ether. The combined filtrate and washings were washed with water, dried over magnesium sulphate and the solvent removed. The oily residue was distilled under reduced pressure, a viscous oil boiling at 161° to 163° C. at 0.013 to 0.015 mm. pressure being collected.

*Analysis.*—Found: C, 87.1; H, 8.5%. $C_{27}H_{32}O$ requires: C, 87.1; H, 8.6%.

EXAMPLE X.—*Preparation of diphenylmethyl alpha-propylbenzyl ether*

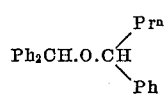

Diphenylbromomethane (24.7 w.), alpha-n-propylbenzyl alcohol (15.0 w.) and triethylamine (10.1 w.) in acetonitrile (20 v.) were boiled under reflux for 45 minutes and the mixture worked up as described in Example VI. The product was a viscous pale yellow oil, boiling at 120° C. under 0.005 mm. pressure.

*Analysis.*—Found: C, 87.1; H, 7.5%. $C_{13}H_{24}O$ requires: C, 87.3; H, 7.6%.

In the following table are summarized the results of tests carried out with the above mentioned compounds to test their efficiency as molluscicides. In these tests, 5 adult snails were exposed for 24 hours to an aqueous dispersion of the toxicant. The snails were then rinsed in fresh water and kept in fresh water for 24 hours, at the end of which time mortality counts were made.

The aqueous dispersions used in these tests were prepared as follows:

The dimethyl ether derivative (10 milligrams) was dissolved in 1 milliliter of acetone containing 8 milligrams Triton X–100 (an alkylphenol/ethylene oxide condensate) as emulsifier and the resulting solution made up to 500 milliliters with water. The aqueous dispersion so obtained contained 20 parts per million (p.p.m. of the ether, 16 p.p.m. of Triton X–100 and 1600 p.p.m. of acetone. This was diluted with water to give dispersions containing lower concentrations of the ether.

In areas where fishery interests are of prime importance, the molluscicidal compound used should preferably be non-toxic or of only low toxicity to fish. The toxicity of some of the more active molluscicidal compounds to fish was therefore determined as follows:

Aqueous dispersions containing various concentrations of the ether were prepared as described above. Two male and two female guppies (*Lebistes reticulatus*) were exposed for 24 hours to each concentration of the ether and were then transferred to fresh water to observe mortality. The tests were carried out in duplicate. The results are summarized in the table, where LC 100 represents the number of parts per million of the test compound which causes 100% mortality of the fish.

TABLE I

| Compound | Fish toxicity, LC 100 p.p.m. | Percent Mortality of *Australorbis glabratus* at concentrations of ether given in p.p.m. | | | | | | |
|---|---|---|---|---|---|---|---|---|
| | | 2 | 1 | 0.5 | 0.25 | 0.12 | 0.06 | 0.03 |
| $Ph_3C$—O—cyclopentyl | 0.125–0.5 | 100 | 100 | 100 | 100 | 100 | 50–100 | |
| $Ph_3C$—O—$CH_2$—OEt | | 100 | 100 | 100 | 20–100 | | | |
| $Ph_3C$—O—$CH_2$—CH=$CH_2$ | | 100 | 100 | 100 | 100 | 100 | | |
| $Ph_3C$—O—$CH_2$—$CH_2Cl$ | | 100 | | | | | | |
| $Ph_3C$—O—$CH_2$—2-furyl | >20 | 100 | 100 | 100 | 100 | 100 | 100 | 100 |
| $Ph_3C$—O—$CH_2$—2-tetrahydrofuryl | 0.125 | 100 | 100 | 100 | 100 | 100 | | |
| $Ph_3C$—O—$CH_2$—2-tetrahydropyranyl | | 100 | 100 | 100 | 100 | | | |
| Ph—CH(2-thienyl)—O—CH(Ph)(2-thienyl) | >10 | 100 | 100 | 40 | | | | |
| $Ph_2$CH—O—CH(Ph)(2-thienyl) | | 100 | 100 | 60–100 | | | | |
| $Ph_2$CH—O—CH(Ph)(n-Propyl) | 80 | 100 | 100 | 100 | 100 | | | |
| PhCh—O—CH(Ph)(n-Hexyl) | >10 | | | | | | | |

It can be seen that the cyclopentyl trityl ether and, particularly the 2-tetrahydrofurfuryl trityl ether are exceedingly toxic to snails, both compounds causing 100% mortality at a concentration of as little as 0.12 p.p.m. These compounds are, however, very toxic to fish and are therefore in general unsuitable for use in fishery areas though eminently suitable for use in non-fishery areas. Where, however, it is desired to apply a piscicide, these compounds are eminently suitable. This is a further feature of the present invention.

For use in fishery areas, 2-furfuryl trityl ether and diphenylmethyl alpha-n-propylbenzyl ether are particularly suitable. The latter compound is practically non-toxic to fish, concentrations of as much as 80 p.p.m. causing no mortality. While not quite so potent a molluscicide as the 2-furfuryl trityl ether, it is still a very powerful molluscicide, causing 100% mortality of snails at concentrations of as little as 0.25 p.p.m.

These ethers control aquatic molluscs when disseminated in the required concentration in the water in which the undesired molluscs are dwelling. Any suitable means for effecting the dissemination can be used—for example, formulations of the ethers can be stirred into the water, injected in a portion of the water wherein the water is in turbulent flow, or like mechanical means can be used. The dissemination can also be effected through the use of a highly hydrophilic surface-active agent, such as the water-soluble non-ionic surface-active agents, water-soluble anionic surface-active agents, particularly the esters of sulfuric acid, and which contain a plurality of ether moieties, and the like.

This invention also provides novel molluscicidal compositions comprising an ether of the general formula hereinbefore specified, as the active ingredient or ingredients, together with a solid or liquid carrier or a surface active agent, or a solid or liquid carrier and a surface active agent.

Aqueous dispersions in which the particles of said ethers are 5 microns or less in diameter, preferably less than 1 micron in diameter and more particularly of colloidal dimensions, exhibit particularly high molluscidial activity. Such dispersions may be prepared by any suitable method known in the art. A particularly suitable method comprises pouring a concentrated solution comprising the ether and a dispersing agent in a water-miscible solvent into water, for example, into the water of the river, pond, irrigation canal etc. to be treated. These solutions and the aqueous dispersions obtained on diluting them with water are preferred compositions of the invention. The water-miscible solvent, may for example, be a water soluble aliphatic ketone such as acetone or methyl ethyl ketone, a water-soluble alcohol such as methyl, ethyl or isopropyl alcohol, dimethylformamide or ethyl oxitol. The dispersing agent suitably constitutes 5 to 20 percent by weight of the solution and preferably 5 to 10 percent by weight thereof. On pouring the solution into water, an opalescent dispersion is obtained in which the ether is present in collodial form. These opalescent dispersions are highly toxic to water snails. The dispersing agent used may be non-ionic, for example, polyalkylene oxide condensation products of alkylphenols such as the condensation product of octylphenol with 8 or 10 molecular proportions of ethylene oxide, or ionic, for example, sodium salts of secondary alkyl sulphuric acid esters containing 10 to 20 carbon atoms in the alkyl group, or sodium salts of sulphonates of alkyl aryl polyethers, or salts (particularly calcium salts) of alkyl aryl sulphonates such as calcium dodecylbenzene sulphonate. Mixtures of non-ionic and ionic dispersing agents may also be used.

The compositions of the invention may also be emulsifiable concentrates comprising a solution or dispersion of the ether in a water-immiscible organic liquid and an emulsifying agent. These compositions form more or less stable emulsions on addition to water. The water-immiscible organic liquid used may be, for example, a hydrocarbon for example, toluene, xylene, a mineral oil, for example kerosine, or a petroleum horticultural spray oil or a chlorinated hydrocarbon, for example a chlorinated benzene, carbon tetrachloride or trichloroethylene. The emulsifying agents may be of the types described above.

The compositions of the invention may also be wettable powders comprising the ether in finely divided form and a dispersing agent such as lignin sulphonates or polyacrylates, or a dispersing agent and a wetting agent such as sodium lauryl sulphate, sodium N-methyl-N-oleyl taurate, sodium salts of petroleum sulphonates, sodium dioctyl sulphosuccinate, sulphonated esters of fatty alcohols, sodium salts of alkyl benzene sulphonates. A finely divided solid adsorbent carrier for example, adsorbent clay or synthetic silica, may be incorporated in the composition. If there is danger that the carrier employed may affect adversely the stability of the ether during storage of the wettable powder, it may be desirable to incorporate a stabilizing agent, for example, ethanolamine, quaternary ammonium compounds, urea, hexamethylene tetramine, phenols, naphthols or chelating agents such as alkali metal salts of ethylenediamine tetraacetic acid. Advantageously the composition is prepared by passing the ingredients through an air jet mill so that the particles are not more than 5 microns and preferably not more than 1 to 2 microns in diameter.

The compositions of the invention may also be in the form of granules, pellets, tablets, blocks or thin sheets comprising the compound and a solid carrier. These may be prepared by impregnating an absorbent carrier such as porous tiles, clay granules or fibrous material such as paper or cloth, with a solution of the ether or a mixture of the ether and a finely divided adsorbent carrier may be granulated or pelleted by methods well known in the art. A thermoplastic or fusible resinous carrier may also be used in making these compositions. Thus, the ether may be dissolved in the molten resinous carrier and the mixture subsequently granulated or pelleted. Alternatively, a resinous carrier which is soluble in an organic solvent may be used, the compound being dissolved in the solution of the resin, the solvent then evaporated and the residue granulated. These compositions may be used against either aquatic or terrestrial molluscs.

The concentration of the molluscicide to be used with the above carriers is dependent upon many factors, including the carrier employed, the method and conditions of application, and the snail or fish species to be controlled, a proper consideration and resolution of these factors being within the skill of those versed in the molluscicide art. In general, however, the ethers of this invention are effective in a concentration of from about 0.001 to 1.0% based upon the total weight of the composition, though under some circumstances as little as about 0.00001% or as much as 2% or even more (for example, up to 45%) of the ether can be employed with good results from a molluscicidal standpoint, as wherein high concentrations of active material are used in low-volume sprays or dusts.

The compositions of the invention may be used in conjunction with, or have incorporated in them, an attractant or bait for the mollusc.

The ether suitably constitutes 0.25 to 1 percent by weight of the attractant or bait though lower or higher concentrations may be used if desired.

The compositions of the invention containing no attractant or bait are preferably used so that when dispersed in water from 0.25 to 1.0 part by weight of the ether is present per million parts of water, though higher concentrations may be used if desired. At least about 0.1 part of the ether per million parts by weight of the water treated generally is required to effect control of aquatic snails within a reasonable time, and ordinarily not more than about 5 parts per million of the ether will be required. A fundamental advantage of the compositions comprising a bait in addition to the ether is that the ether content is not related to the volume of water to which the composition is applied.

The molluscicides of this invention can be employed alone, or in combination with other biologically active compounds, such as insecticides, fungicides, weed killers (particularly aquatic weedkillers to destroy vegetation on which the snails can climb to avoid molluscicide in water), fertilizers, etc. These molluscicides are not merely specific against certain distinct molluscs, such as Australorbis glabratus, but will be effective against all snails and slugs, and molluscs generally, including, for example other species of Australois, such as *A. quadelupensis*, species of Bulinus, such as *B. truncatus*, and *B. angolensis*, species of Tropicorpus, such as *T. centrimetralis*, species of Limnae, such as *L. natalensis*, *L. bulimoides*, and *L. auricularia*, species of Biophalaria, species of Galba, species of Oncomelania, species of Taphius, such as *T. glabratus*, species of Helisoma such as *H. trivolvis*, species of Marisa, such as *M. cornuarietis*, species of Pomacea, such as *P. lineata* and *P. glauca*, and species of Ocinebra, such as *O. japonica*.

I claim as my invention:
1. Trityl 2-furfuryl ether.
2. Trityl 2-tetrahydrofurfuryl ether.
3. Trityl cylcopentyl ether.
4. An ether of the formula:

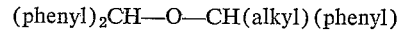

wherein "alkyl" represents alkyl of from 1 to 7 carbon atoms.

5. Diphenylmethyl alpha-n-propylbenzyl ether.
6. An ether of the formula

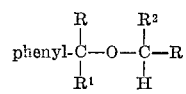

wherein
R is phenyl or hydrogen;
R¹ is phenyl or thienyl;
R² is lower straight-chain alkenyl, mono-, chloro- or bromo-substituted lower alkyl, cyclopentyl, cyclohexyl or a heterocyclic radical selected from the group consisting of furyl, tetrahydrofuryl, tetrahydropyranyl and thienyl;
said R¹ and R² heterocyclic radicals being unsubstituted and being bonded to the indicated carbon atom of said ether by a bond to a carbon atom of the heterocyclic ring; and with the proviso that when R¹ is thienyl, R² is thienyl.

7. The ether of claim 6 wherein R² is 2-furyl, 2-tetrahydrofuryl, 2-tetrahydropyranyl or 2-thienyl.

References Cited
FOREIGN PATENTS
425,791  2/1945  Canada.

NICHOLAS S. RIZZO, *Primary Examiner.*